(12) United States Patent
Liu

(10) Patent No.: US 7,245,792 B2
(45) Date of Patent: Jul. 17, 2007

(54) SILICON-BASED TUNABLE SINGLE PASSBAND OPTICAL FILTER

(75) Inventor: Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 486 days.

(21) Appl. No.: 10/222,218

(22) Filed: Aug. 16, 2002

(65) Prior Publication Data

US 2004/0033003 A1 Feb. 19, 2004

(51) Int. Cl.
*G02B 6/12* (2006.01)

(52) U.S. Cl. .............................. 385/14; 385/24; 385/37

(58) Field of Classification Search .................. 385/37, 385/14, 27, 129–132, 24; 372/6, 102
See application file for complete search history.

(56) References Cited

U.S. PATENT DOCUMENTS

| | | | |
|---|---|---|---|
| 4,518,219 A | 5/1985 | Leonberger et al. | |
| 4,725,110 A * | 2/1988 | Glenn et al. | 359/3 |
| 4,815,084 A * | 3/1989 | Scifres et al. | 372/46 |
| 4,872,738 A * | 10/1989 | Risk et al. | 359/285 |
| 4,984,894 A | 1/1991 | Kondo | |
| 5,082,342 A | 1/1992 | Wight et al. | |
| 5,119,231 A * | 6/1992 | Nelson et al. | 359/359 |
| 5,159,601 A * | 10/1992 | Huber | 372/6 |
| 5,195,161 A | 3/1993 | Adar et al. | |
| 5,212,745 A | 5/1993 | Miller | |
| 5,237,576 A * | 8/1993 | DiGiovanni et al. | 372/6 |
| 5,247,528 A | 9/1993 | Shinozaki et al. | |
| 5,285,274 A | 2/1994 | Tanno et al. | |
| 5,315,437 A | 5/1994 | Alfano et al. | |
| 5,337,183 A * | 8/1994 | Rosenblatt | 359/248 |
| 5,379,318 A | 1/1995 | Weber | |
| 5,418,802 A | 5/1995 | Chwalck | |
| 5,446,809 A | 8/1995 | Fritz et al. | |
| 5,448,404 A | 9/1995 | Schrenk et al. | |

(Continued)

FOREIGN PATENT DOCUMENTS

EP 1094574 A1 4/2001

OTHER PUBLICATIONS

Willner, A.E., "Tunable Compensation of Channel Degrading Effects Using Nonlinearly Chirped Passive Fiber Bragg Gratings", IEEE Journals of Selected Topics in Quantum Electronics, vol. 5, No. 5, pp. 1298-1311, Sep./Oct. 1999.

(Continued)

*Primary Examiner*—Ellen E. Kim
(74) *Attorney, Agent, or Firm*—Blakely, Sokoloff, Taylor & Zafman LLP

(57) ABSTRACT

A tunable optical filter includes a tunable Fabry-Perot (FP) filter, two tunable waveguide Bragg gratings (WBGs) and a 2×2 3-dB coupler. In one embodiment, the WBGs are implemented in a silicon substrate using polysilicon filled trenches. The FP filter is implemented with two silicon nitride trench WBGs with a gap region between them. The FP filter and the WBGs are respectively tuned to transmit and reflect a selected wavelength. A broadband optical signal is propagated into a first port of the coupler. The coupler propagates half of the beam to one WBG and the other half to the other WBG. The WBGs reflect these portions back to the coupler, which then propagates the reflected portions to the FP filter.

11 Claims, 5 Drawing Sheets

U.S. PATENT DOCUMENTS

| | | | |
|---|---|---|---|
| 5,467,732 | A | 11/1995 | Donnelly, Jr. et al. |
| 5,493,113 | A * | 2/1996 | Dunphy et al. ......... 250/227.19 |
| 5,511,083 | A * | 4/1996 | D'Amato et al. .............. 372/6 |
| 5,511,142 | A * | 4/1996 | Horie et al. ................. 385/129 |
| 5,550,373 | A * | 8/1996 | Cole et al. ............... 250/338.1 |
| 5,600,665 | A * | 2/1997 | Minden et al. ................. 372/6 |
| RE35,516 | E | 5/1997 | Henry et al. |
| 5,627,927 | A * | 5/1997 | Udd ............................ 385/37 |
| 5,636,309 | A * | 6/1997 | Henry et al. ................ 385/129 |
| 5,668,900 | A | 9/1997 | Little et al. |
| 5,689,358 | A | 11/1997 | Nakao et al. |
| 5,751,466 | A | 5/1998 | Dowling et al. |
| 5,764,829 | A | 6/1998 | Judkins et al. |
| 5,781,268 | A * | 7/1998 | Liu et al. ..................... 349/198 |
| 5,796,902 | A | 8/1998 | Bhat et al. |
| 5,801,378 | A | 9/1998 | Hane et al. |
| 5,841,931 | A * | 11/1998 | Foresi et al. ................ 385/131 |
| 5,907,427 | A | 5/1999 | Scalora et al. |
| 5,915,051 | A | 6/1999 | Damask et al. |
| 6,011,881 | A | 1/2000 | Moslehi et al. |
| 6,014,480 | A | 1/2000 | Baney |
| 6,061,481 | A | 5/2000 | Heidrich et al. |
| 6,075,908 | A | 6/2000 | Paniccia et al. |
| 6,115,518 | A * | 9/2000 | Clapp .......................... 385/37 |
| 6,141,469 | A | 10/2000 | Kashyap |
| 6,172,791 | B1 | 1/2001 | Gill et al. |
| 6,221,565 | B1 | 4/2001 | Jain et al. |
| 6,233,381 | B1 | 5/2001 | Borrelli et al. |
| 6,259,529 | B1 | 7/2001 | Sorin et al. |
| 6,266,464 | B1 * | 7/2001 | Day et al. ...................... 385/37 |
| 6,268,953 | B1 | 7/2001 | Maloney |
| 6,327,036 | B1 | 12/2001 | Bao et al. |
| 6,330,255 | B1 | 12/2001 | Hung |
| 6,330,383 | B1 | 12/2001 | Cai et al. |
| 6,337,737 | B1 | 1/2002 | Chang et al. |
| 6,343,167 | B1 | 1/2002 | Scalora et al. |
| 6,363,202 | B1 | 3/2002 | Goodfellow |
| 6,373,872 | B2 * | 4/2002 | Deacon ........................ 372/34 |
| 6,374,013 | B1 * | 4/2002 | Whiteaway et al. .......... 385/37 |
| 6,411,756 | B2 | 6/2002 | Sadot et al. |
| 6,438,277 | B1 | 8/2002 | Eggleton et al. |
| 6,459,533 | B1 * | 10/2002 | Clapp et al. ................. 359/578 |
| 6,480,513 | B1 | 11/2002 | Kapany et al. |
| 6,529,649 | B1 * | 3/2003 | Soole ........................... 385/14 |
| 6,538,783 | B1 * | 3/2003 | Stephens ..................... 398/82 |
| 6,546,160 | B1 * | 4/2003 | Schunk ......................... 385/14 |
| 6,600,864 | B2 | 7/2003 | Samara-Rubio et al. |
| 6,628,450 | B2 | 9/2003 | Samara-Rubio |
| 6,661,937 | B2 | 12/2003 | Sobiski et al. |
| 6,674,928 | B2 | 1/2004 | Johnson et al. |
| 6,748,138 | B2 | 6/2004 | Wang et al. |
| 6,775,427 | B2 * | 8/2004 | Evans .......................... 385/14 |
| 6,853,671 | B2 | 2/2005 | Liu et al. |
| 6,856,732 | B2 | 2/2005 | Liu et al. |
| 6,900,930 | B2 | 5/2005 | Ovadia et al. |
| 7,061,963 | B2 * | 6/2006 | Takemi et al. ................ 372/96 |
| 2002/0025097 | A1 | 2/2002 | Cooper et al. |
| 2002/0047129 | A1 * | 4/2002 | Frick et al. ................... 257/89 |
| 2002/0085810 | A1 * | 7/2002 | Lee et al. ..................... 385/39 |
| 2002/0113966 | A1 | 8/2002 | Shchegrov et al. |
| 2002/0135876 | A1 * | 9/2002 | Holm et al. ................ 359/566 |
| 2002/0164142 | A1 * | 11/2002 | Csutak ....................... 385/131 |
| 2002/0191912 | A1 * | 12/2002 | Robinson et al. ............ 385/37 |
| 2002/0197011 | A1 | 12/2002 | Liu et al. |
| 2003/0013438 | A1 | 1/2003 | Darby |
| 2003/0020865 | A1 | 1/2003 | Hoke |
| 2003/0021305 | A1 | 1/2003 | Lundqvist |
| 2003/0025976 | A1 | 2/2003 | Wipiejewski |
| 2003/0086155 | A1 | 5/2003 | Ovadia et al. |
| 2003/0086655 | A1 | 5/2003 | Deacon |
| 2003/0091086 | A1 | 5/2003 | Sahara et al. |
| 2003/0091287 | A1 * | 5/2003 | Lam et al. .................... 385/40 |
| 2003/0099018 | A1 | 5/2003 | Singh et al. |
| 2004/0033020 | A1 * | 2/2004 | LoCascio et al. ............. 385/37 |
| 2004/0052522 | A1 | 3/2004 | Fishteyn et al. |

OTHER PUBLICATIONS

Giles, C.R., "Lightwave Applications of Fiber Bragg Gratings", Journal of Lightwave Technology, vol. 15, No. 8, pp. 1391-1404, Aug. 1997.

Sugden, K., "Fabrication and Characterization of Bandpass Filters Based on Concatenated Chirped Fiber Gratings", Journal of Lightwave Technology, vol. 15, No. 8, pp. 1424-1432, Aug. 1997.

Erdogan, T., "Fiber Grating Spectra", Journal of Lightwave Technology, vol. 15, No. 8, pp. 1277-1294, Aug. 1997.

Hill, K. O., "Fiber Bragg Grating Technology Fundamentals and Overview", Journal of Lightwave Technology, vol. 15, No. 8, pp. 1263-1276, Aug. 1997.

Studenkov, P.V., "Asymmetric Twin-Waveguide 1.55-mm Wavelength Laser with a Distributed Bragg Reflector", IEEE Photonics Technology Letters, vol. 12, No. 5, pp. 468-470, May 2000.

"Encyclopedia.com-Results for laser", http://www.encyclopedia.com/articles/07237.html.

"Encycopedia.com-Results for laser: Coherent Light and Its Emission in Lasers", http://www.encyclopedia.com/articles/07237.html.

"Encyclopedia.com-Results for laser: Characteristics of Lasers", http://www.encyclopedia.com/articles/07237.html.

"Encyclopedia.com-Results for laser: Applications of Lasers", http://www.encyclopedia.com/articles/07237.html.

"Laser", Encarta Encyclopedia, http://encarta.msn.com/Concise.asp?z=1&pg=2&ti=761578658.

"Howstuffworks "How Lasers Work"", http://www.howstuffworks.com/laser.htm.

"The Basics of an Atom", Howstuffworks "How Lasers Work", http://www.howstuffworks.com/laser1.htm.

"The Laser/Atom Connection", Howstuffworks "How Lasers Work", http://www.howstuffworks.com/laser2.htm.

"Three-Level Laser", Howstuffworks "How Lasers Work", http://www.howstuffworks.com/laser3.htm.

"Types of Lasers", Howstuffworks "How Lasers Work", http://www.howstuffworks.com/laser4.htm.

"Laser Classifications", Howstuffworks "How Lasers Work", http://www.howstuffworks.com/laser5.htm.

"Links", Howstuffworks "How Lasers Work", http://www.howstuffworks.com/laser6.htm.

Maluf, N., "Lasers: A Tutorial", New Focus, Opticon 2001, San Jose, CA., pp. 1-48.

Bilodeau, F. et al., High-Return-Loss Narrowband All-Fiber Bandpass Bragg Transmission Filter, IEEE Photonics Technology Letters, vol. 6, No. 1, Jan. 1994.

Wiesmann, D. et al., "Apodized Surface-Corrugated Gratings with Varying Duty Cycles", IEEE Photonics Technology Letters, vol. 12, No. 6, pp. 639-641, Jun. 2000.

Shibata, Y. et al., "Coupling Coefficient Modulation of Waveguide Grating Using Sampled Grating Using Sampled Grating", IEEE Photonics Technology Letters, vol. 6, No. 10, pp. 1222-1224, Oct. 1994.

* cited by examiner

CALCULATED REFLECTION SPECTRUM OF POLY GRATING
AND TRANSMISSION SPECTRUM OF A $Si/Si_3N_4$ BASED FILTER

SILICON-BASED TUNABLE SINGLE PASSBAND OPTICAL FILTER

FIELD OF THE INVENTION

Embodiments of invention relate generally to optical devices and, more specifically but not exclusively relate to semiconductor-based optical filters.

BACKGROUND INFORMATION

Transmission bandwidth demands in telecommunication networks (e.g., the Internet) appear to be ever increasing and solutions are being sought to support this bandwidth demand. One solution to the problem is to use optical networks, where dense wavelength-division-multiplexing (DWDM) technology is used to support the ever-growing demand for higher data rates. Commonly used optical components include optical filters.

One conventional optical filter uses a Fabry-Perot (FP) filter. As is well known, FP filters have two reflective surfaces and a cavity between. A FP filter allows optical signals of the resonant wavelengths to pass through, reflecting signals that are not of the resonant wavelengths. However, a conventional FP filter has multiple transmission peaks with the distance between peaks referred to as the free spectral range (FSR). FP filters achieve relatively narrow pass bands, which are desirable in many optical filter applications, but the multiple transmission peaks may be unsuitable for DWDM applications. The FSR may be decreased by lengthening the distance between the reflective surfaces, but this increases the width of the pass bands. Further, conventional PWC-based FP filters are typically implemented using MEM technology or other relatively complex technology. Thus, a conventional FP filter may not be practical for use in DWDM applications.

On conventional optical filter uses a Fabry-Perot (FP) filter. As is well known, FP filters have two reflective surfaces and a cavity between. A FP filter allows optical signals of the resonant wavelengths to pass through, reflecting signals that are not of the resonant wavelengths. However, a conventional FP filter has multiple transmission peaks with the distance between peaks referred to as the free spectral range (FSR). FP filters achieve relatively narrow pass bands, which are desirable in many optical filter applications, but the multiple transmission peaks may be unsuitable for DWDM applications. The FSR may be decreased by lengthening the distance between the reflective surfaces, but this increases the width of the pass bands. Further, conventional PWC-based FP filters are typically implemented using MEM technology or other relatively complex technology. Thus, a conventional FP filter may not be practical for use in DWDM applications.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Embodiments of the present invention are directed to apparatus and systems (and methods thereof) for optical filtering having a semiconductor-based FP filter, two waveguide Bragg gratings (WBGs) and a 2×2 3-dB coupler (also referred to herein as a three-dB coupler). The WBGs are tuned to reflect the desired wavelength to be passed by the optical filter. A multi-wavelength input signal is provided at a first port (i.e., input port) of the three-dB coupler. The two WBGs are coupled to second and third ports of the three-dB coupler so that the input signal when split by the three-dB coupler (into two portions of substantially equal power) is received by the two WBGs. The two WBGs introduce a ½π phase shift between the split signals. The WBGs reflect the desired wavelength of the split signals back to the three-dB coupler. The two optical beams reflected from WBGs interfere with each other in the three-dB coupler. Consequently, the three-dB coupler propagates almost all the reflected signals to the fourth port with almost no reflected light at its input port. This fourth port is coupled to the FP filter. The FP filter is designed with a narrow passband (also referred to herein as "linewidth") to further filter the combined reflected signal.

This architecture advantageously allows the FP filter to be designed with a relatively small FSR (and therefore a more narrow linewidth) because the WBGs serve to filter out the other wavelength components of the input signal. For example, the FP filter can be designed with a FSR just large enough to avoid passing the sidelobes of the reflected signals from the uniform WBGs. Thus, relatively simple WBGs may be used (e.g., WBGs with uniform gratings) while achieving a desired linewidth for the tunable optical filter. Various embodiments of the present invention are described below.

Figure 1:
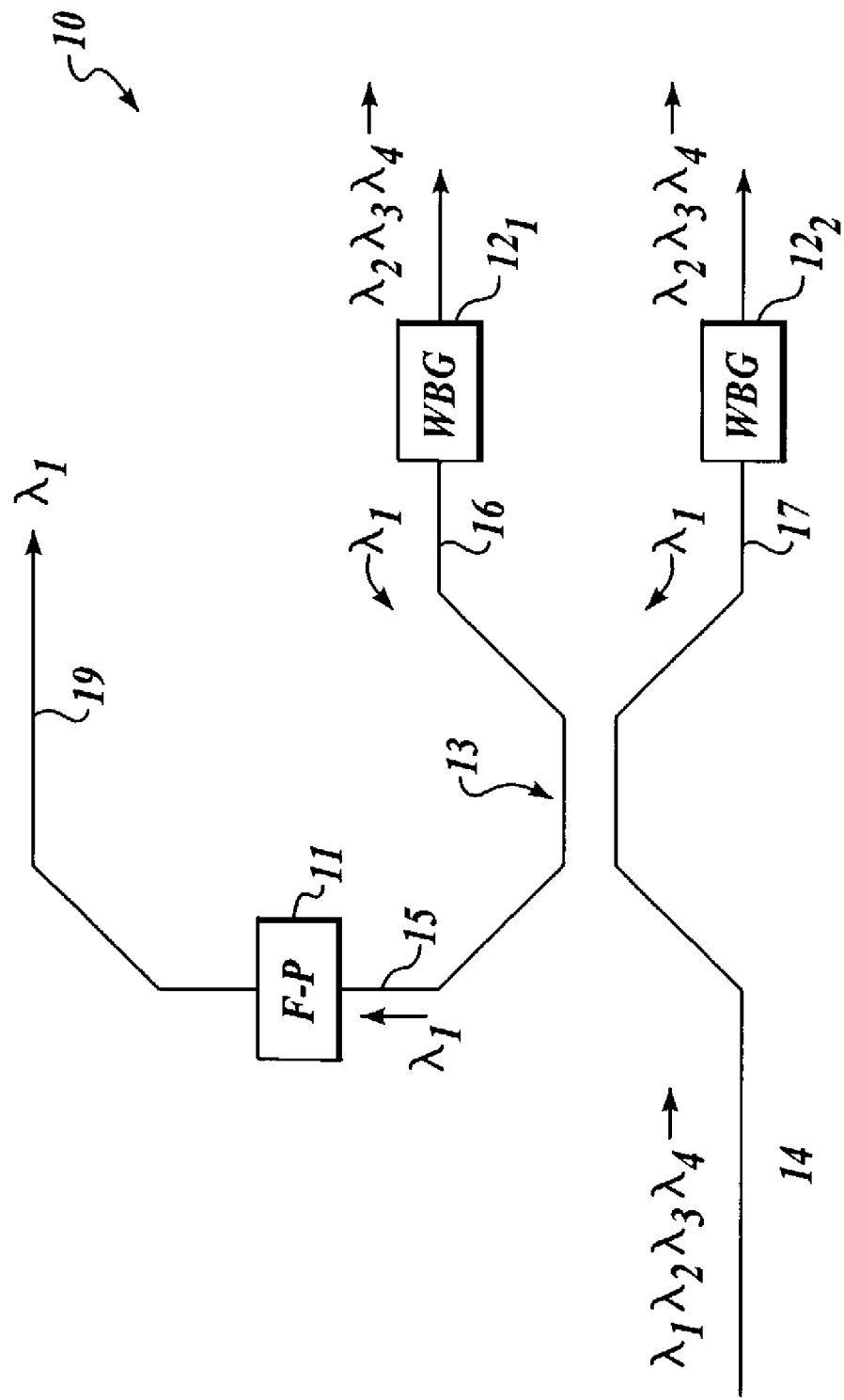
FIG. 1 is a diagram illustrating a tunable semiconductor-based single passband optical filter, according to one embodiment of the present invention.

FIG. 1 illustrates a semiconductor-based tunable optical filter 10, according to one embodiment of the present invention. In this embodiment, tunable optical filter 10 includes a tunable semiconductor-based Fabry-Perot (FP) filter 11, tunable waveguide Bragg grating (WBGs) 12$_1$ and 12$_2$, and a 2×2 3 dB coupler 13 (also referred to herein as a three dB coupler). Implementations of tunable FP filter 11 and tunable WBGs 12$_1$ and 12$_2$ are described below. Three-dB coupler 13 can be implemented with any suitable optical coupling device such as, for example, a resonant waveguide coupler or a multi-mode interference (MMI) device.

The elements of tunable optical filter 10 are interconnected as follows. One port of three-dB coupler 13 is connected to one end of a waveguide 14, which is coupled to receive an input optical signal at its other end. In one embodiment, the input optical signal is a signal for use in a WDM system having wavelengths $\lambda_1, \lambda_2, \lambda_3$ and $\lambda_4$. Another port of three-dB coupler 13 is coupled to tunable FP filter 11 via a waveguide 15. Tunable WBGs $12_1$ and $12_2$ are coupled to the two remaining ports of three-dB coupler 13 via waveguides 16 and 17, respectively. In this embodiment, tunable WBGs $12_1$ and $12_2$ are connected to three-dB coupler 13 so that they receive the input signal when it is split by three-dB coupler 13. Further, tunable FP filter 11, tunable WBGs $12_1$ and $12_2$, three-dB coupler 13 and waveguides 14–17 are implemented on a single semiconductor substrate in some embodiments.

Tunable optical filter 10 can be tuned to pass one of the wavelengths of a multi-wavelength input signal. For example, in the example embodiment of FIG. 1, tunable optical filter 10 is configured to pass wavelength $\lambda_1$. Although the following description is directed toward this "$\lambda_1$" example, tunable FP filter 11 and tunable WBGs $12_1$ and $12_2$ can be tuned to other wavelengths, depending on the application.

In operation, the multi-wavelength input signal propagates to three-dB coupler 13 via waveguide 14. In particular, the input signal has wavelengths $\lambda_1, \lambda_2, \lambda_3$ and $\lambda_4$. Three-dB coupler 13 splits the input signal so that about one half of the signal power propagates to tunable WBG $12_1$ via waveguide 16 and the other half of the signal power propagates to tunable WBG $12_2$ via waveguide 17. In particular, the portion propagated to tunable WBG $12_1$ has a phase shift of about ½π relative to the portion propagated to tunable WBG $12_2$ because of the three-dB coupler.

Tunable WBGs $12_1$ and $12_2$ are tuned to have a center wavelength of $\lambda_1$, thereby reflecting wavelength $\lambda_1$ and passing wavelengths $\lambda_2, \lambda_3$ and $\lambda_4$. The reflected $\lambda_1$ wavelengths again pass through three-dB coupler 13. The two optical beams reflected from WBGs $12_1$ and $12_2$ interfere with each other in the three-dB coupler. As a result, the three-dB coupler propagates almost all the reflected signals to the fourth port with almost no reflected light power at its input port.

Tunable FP filter 11 is tuned to pass wavelength $\lambda_1$. Thus, the reflected $\lambda_1$ portions propagating to tunable FP filter 11 are filtered by tunable FP filter 11 to pass a relatively narrow wavelength band centered on wavelength $\lambda_1$. In one embodiment, tunable FP filter 11 is configured to have a FSR larger than the reflection linewidth of tunable WBGs $12_1$ and $12_2$ (i.e., the peak and major sidelobes of their reflection spectrums). Because the passband of tunable WBG $12_1$ (and tunable WBG $12_2$) is relatively small compared to the entire wavelength band spanned by wavelengths $\lambda_1, \lambda_2, \lambda_3$ and $\lambda_4$, tunable FP filter 11 can be configured to have a linewidth that is significantly narrower than the linewidth of the WBGs. Thus, tunable optical filter 10 can be used for DWDM applications.

Figure 2:
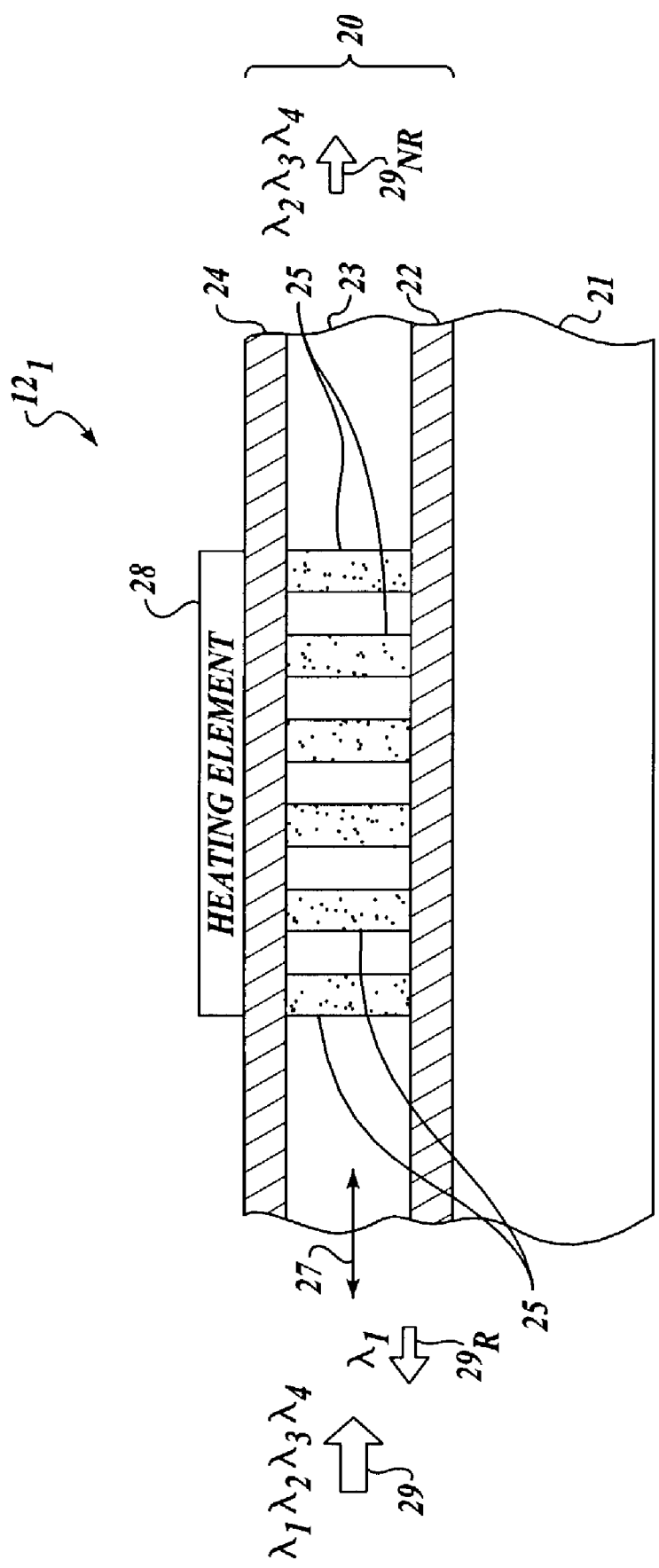
FIG. 2 is a diagram illustrating a cross section of a tunable semiconductor-based WBG depicted in FIG. 1, according to one embodiment of the present invention.

FIG. 2 illustrates an implementation of tunable WBG $12_1$ (FIG. 1), according to one embodiment of the present invention. Tunable WBG $12_2$ (FIG. 1) is substantially similar. In this embodiment, tunable WBG $12_1$ is formed in a waveguide 20 formed in a semiconductor substrate. The semiconductor substrate includes substrate layer 21, a cladding layer 22 formed above substrate layer 21, a core layer 23 formed on cladding layer 22, another cladding layer 24 formed on core layer 23. In one embodiment, layers 21–24 are formed using silicon on insulator (SOI) technology.

In addition, several regions 25 are formed in core layer 23 along waveguide 20. In some embodiments, regions 25 are filled trenches, with the fill material having a refractive index different from that of the material of core layer 23. For example, in one embodiment, core layer 23 is crystalline silicon of a silicon wafer, with regions 25 being polysilicon material. In other embodiments, different materials can be used for core layer 23 and regions 25, provided the selected materials have different refractive indices.

Waveguide 20 implements an optical path 27, represented in FIG. 2 as a double-headed arrow. In this embodiment, regions 25 are formed to be substantially perpendicular to optical path 27. Regions 25, in this embodiment, are polysilicon-filled trenches formed in core layer 23 using standard photolithographic and deposition processes. In one embodiment, the polysilicon is formed in the trenches using a suitable deposition technique such as, for example, low-pressure chemical vapor deposition (LPCVD). In other embodiments, regions 25 may be formed by doping regions 25 to alter the regions' refractive indices. A heating element 28 is formed on top of waveguide 20 over regions 25. As will be discussed below, heating element 28 is used to tune WBG $12_1$ by changing the temperature (and thus the refractive indices) of the materials near heating element 28.

In operation, an optical beam 29 is propagated along optical path 27 through waveguide 20. The interfaces between the regions 25 and core layer 23 in the optical path 27 result in periodic or quasi-periodic perturbations in the effective refractive index along optical path 27. These perturbations cause multiple reflections of portions of optical beam 29. When the Bragg condition is satisfied, wavelength components of optical beam 29 having a Bragg wavelength will be reflected by WBG $12_1$ (indicated by an arrow $29_R$ in FIG. 2). Conversely, wavelength components of optical beam 29 having non-Bragg wavelengths will propagate through WBG $12_1$ (indicated by an arrow $29_{NR}$ in FIG. 2).

In a further refinement, $\Delta n_{eff}$ can be changed by performing/controlling an annealing process on the polysilicon of regions 25. For example, in one embodiment, regions 25 are formed by filling the trenches with amorphous silicon (α-Si) and then annealing the α-Si to form polysilicon. The refractive index of the resulting polysilicon ($n_{poly}$) can depend on the annealing process. Thus, by appropriately controlling the annealing process to control $n_{poly}$, $\Delta n_{eff}$ can be controlled.

Silicon and polysilicon have effective refractive indices of $n_{Si}$ and $n_{poly}$, respectively. A relatively small effective refractive index difference $\Delta n_{eff}$ (or $n_{poly}$-$n_{Si}$) is provided at each interface between core layer 23 and regions 25. In one embodiment, $\Delta n_{eff}$ is approximately within the range of 0.005 to 0.01. Other value ranges for $\Delta n_{eff}$ may be utilized in other embodiments of the present invention and that 0.005 to 0.01 is provided herewith for explanation purposes.

In a further refinement, $\Delta n_{eff}$ can be changed by performing/controlling an annealing process on the polysilicon of regions 105. For example, in one embodiment, regions 105 are formed by filling the trenches with amorphous silicon (a-Si) and then annealing the α-Si to form polysilicon. The refractive index of the resulting polysilicon ($n_{poly}$) can depend on the annealing process. Thus, by appropriately controlling the annealing process to control $n_{poly}$, $\Delta n_{eff}$ can be controlled.

As previously described, core layer 23 can be implemented as part of a SOI wafer. In one embodiment, cladding layer 22 is implemented as a buried oxide layer using known SOI processes. As a result, cladding layer 22 is disposed between silicon core layer 23 and the rest of the silicon substrate, indicated as substrate layer 21 in FIG. 2.

Figure 2A:
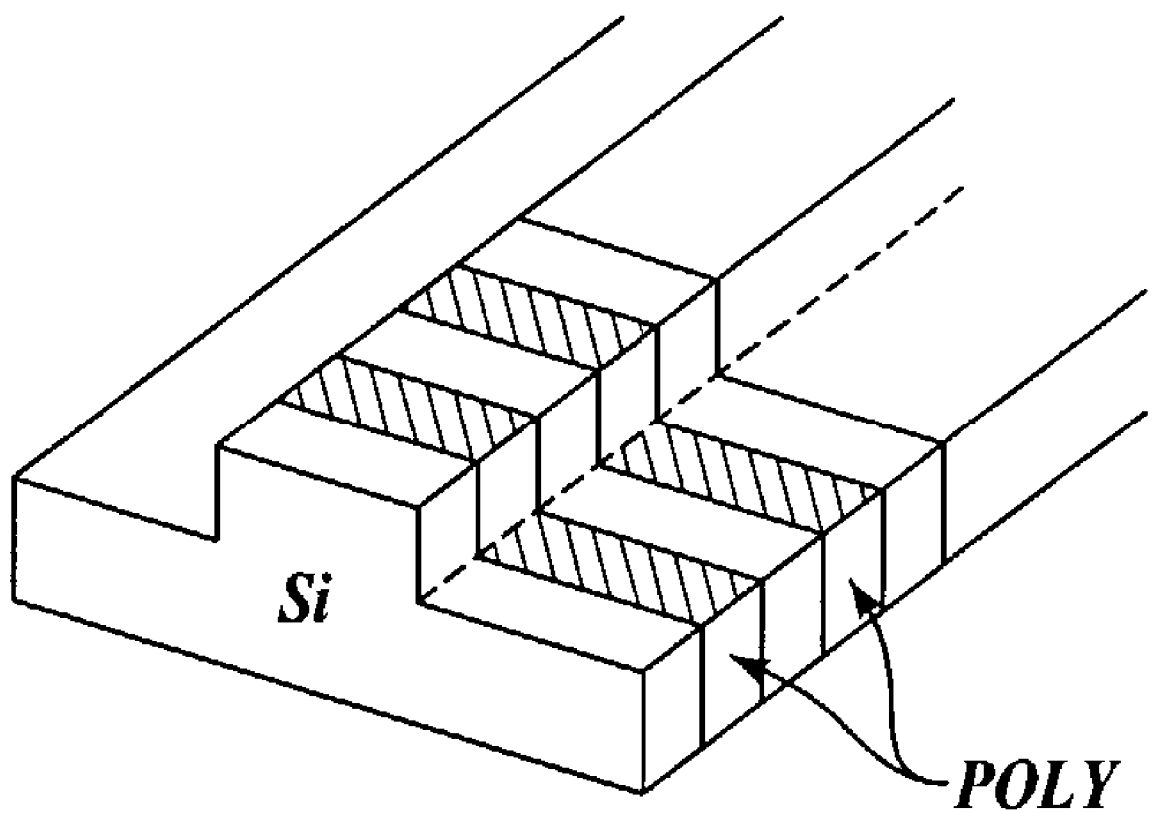
FIG. 2A is a diagram illustrating a perspective view of the tunable WBG depicted in FIG. 2, according to one embodiment of the present invention.

In this embodiment, an additional cladding layer 24 is formed on core layer 23 such that core layer 23 is disposed between cladding layers 22 and 24. Cladding layer 24 can be formed on the SOI wafer using standard deposition or low-temperature oxidation processes. In one embodiment, cladding layer 24 is an oxide material or the like. In this embodiment, waveguide 20 is a rib waveguide as shown in FIG. 2A (the cladding layers and heating element are omitted to promote clarity).

As previously described, there are periodic or quasi-periodic perturbations in the effective index of refraction along optical path 27 through waveguide 20. Because of the effective refractive index difference $\Delta n_{eff}$ described above, multiple reflections of optical beam 29 occur at the several interfaces between core layer 23 and regions 25 along optical path 27. In this embodiment, a Bragg reflection occurs when a Bragg condition or phase matching condition is satisfied. In particular, for uniform Bragg gratings, a Bragg reflection occurs when the following condition is satisfied:

$$m\lambda_B = 2n_{eff}\Lambda, \quad (1)$$

where m is the diffraction order, $\lambda_B$ is the Bragg wavelength, $n_{eff}$ is the effective index of the waveguide and $\Lambda$ is the period of the grating.

To illustrate, FIG. 2 shows a Bragg condition existing for $\lambda_B$ equal to $\lambda_1$. Optical beam 29 (including wavelengths $\lambda_1$, $\lambda_2$, $\lambda_3$ and $\lambda_4$) propagates to WBG $12_1$ at one end of waveguide 20. Wavelength $\lambda_1$ is included in optical beam $29_R$, which reflected back out of waveguide 20 by WBG $12_1$ as described above. The remainder of optical beam 29 propagates along optical path 27 through waveguide 20 such that the remaining wavelengths (e.g. $\lambda_2$, $\lambda_3$ and $\lambda_4$) are included optical beam $29_{NR}$, which propagates out the opposite end of waveguide 20. Accordingly, the Bragg wavelength $\lambda_1$ is filtered from optical beam 29 and directed out of WBG $12_1$ as optical beam $29_R$.

In this embodiment, WBG $12_1$ is tunable via heating element 28. In one embodiment, heating element 28 is formed from a metallic material. Heating element 28 controls the temperature of core layer 23 and regions 25. More particularly, the indices of refraction of the materials of core layer 23 and regions 25 can vary with temperature. Thus, by controlling the temperature of core layer 23 and regions 25, the Bragg wavelength can be shifted. In applications in which the WBG need not be tunable, heating element 28 may be omitted.

In other alternative embodiments (not shown), the Bragg wavelength can be tuned by applying a modulated electric field to core layer 23 and regions 25 to change the effective refractive indices of core layer 23 and regions 25. For example, the plasma optical effect as described in U.S. patent application Ser. No. 09/881,218 filed Jun. 13, 2001 by Ansheng Liu et al., entitled "Method And Apparatus For Tuning A Bragg Grating In A Semiconductor Substrate" can be used.

Figure 3:
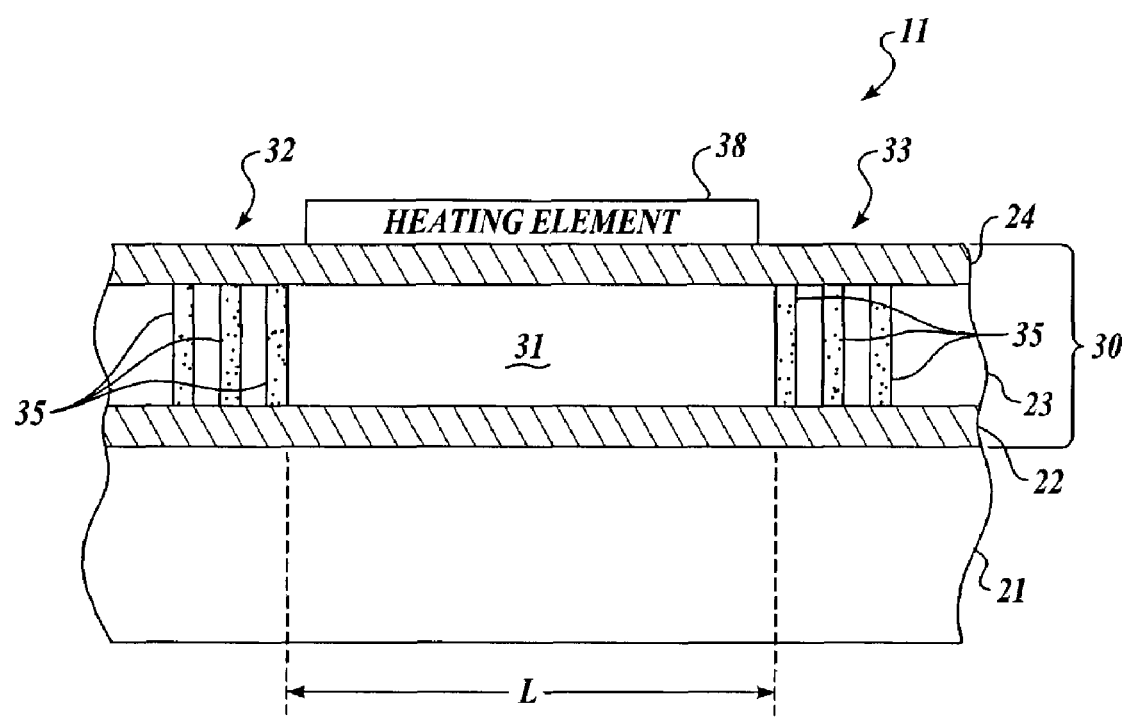
FIG. 3 is a diagram illustrating a cross section of a tunable waveguide FP filter depicted in FIG. 1, according to one embodiment of the present invention.

FIG. 3 illustrates an implementation of tunable FP filter 11 (FIG. 1), according to one embodiment of the present invention. In this embodiment, tunable FP filter 11 is formed by implementing two reflectors in a waveguide 30 with a resonator region 31 of length L between them. In this embodiment, the two reflectors are implemented with two WBGs. The two WBGs serve as reflecting surfaces while the length of waveguide between the WBGs (i.e., resonator region 31) serves as the FP cavity.

Figure 3A:
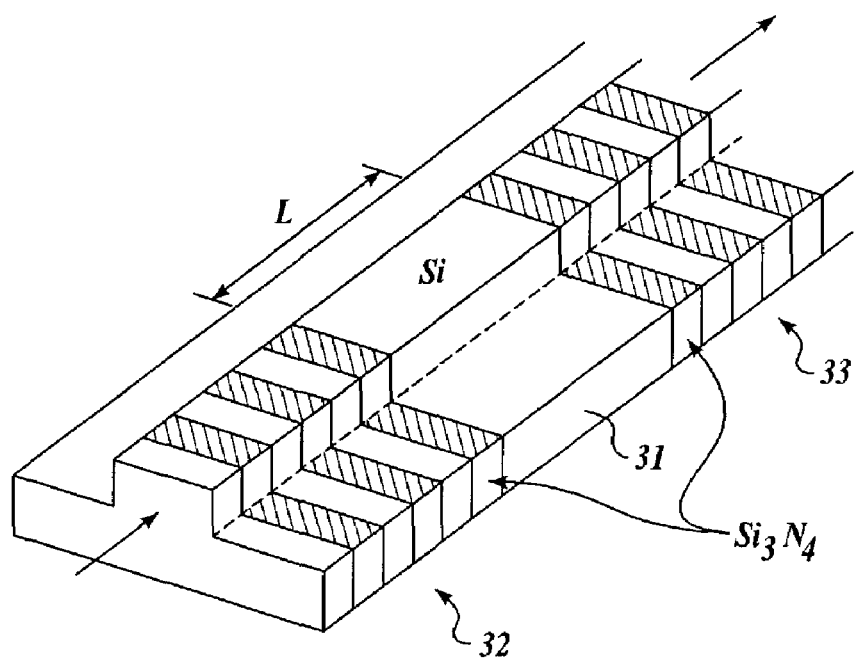
FIG. 3A is a diagram illustrating a perspective view of the tunable FP filter depicted in FIG. 3, according to one embodiment of the present invention.

In this embodiment, FP filter 11 includes WBGs 32 and 33 formed in a waveguide 30 in substantially the same manner as described above for WBG $12_1$ (FIG. 2) without the heating element. In addition, in this embodiment, WBGs 32 and 33 have silicon nitride regions 35 instead of the polysilicon regions 25 (FIG. 2) of WBG $12_1$. Because the large refractive index difference (~1.5) between silicon and silicon nitride, a very broad reflection spectrum (~130 nm) with high reflectivity of WBGs 32 and 33 can be obtained with a small number of periods (i.e., regions 35). For example, in one embodiment, the length of the WBGs can be about twenty microns, with each region being about one micron wide. In other embodiments, different materials can be used for core layer 23 and regions 25, provided the selected materials have different refractive indices. In this embodiment, tunable FP filter 11 has a heating element 38 disposed over resonator region 31 rather than over the WBGs as in WBGs $12_1$ and $12_2$ (FIG. 2). As in the WBGs, the heating element is used to control the temperature (and thereby the refractive index) of material below the heating element. In this way, the center frequency of tunable FP filter 11 can be controlled. In some embodiments, waveguide 30 is a rib waveguide as shown in FIG. 3A (the cladding layers and heating element are omitted to promote clarity).

Figure 4:
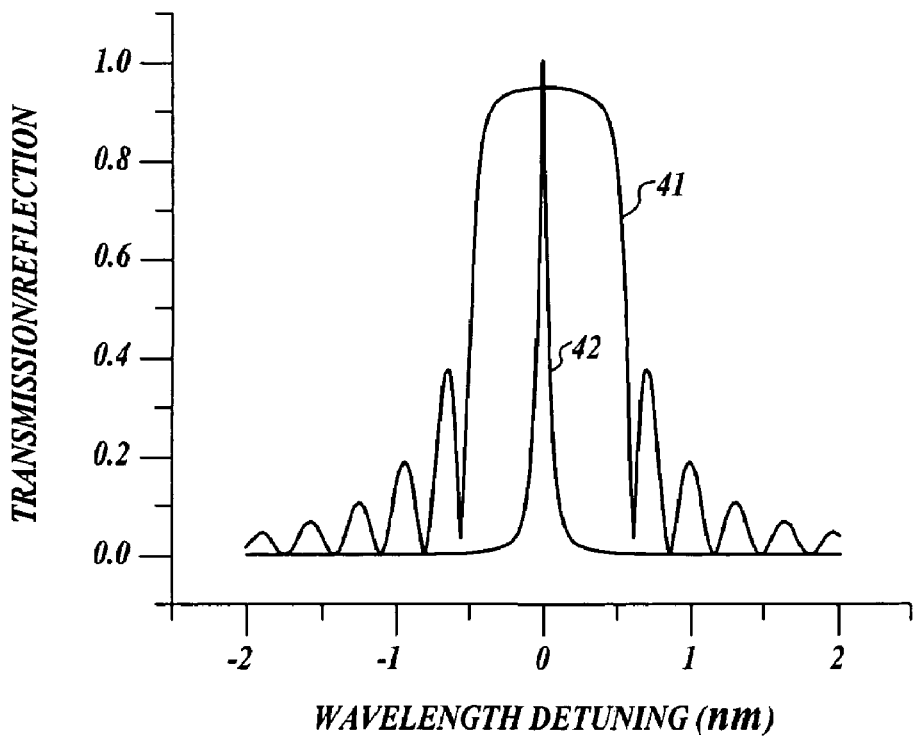
FIG. 4 is a diagram illustrating the reflection spectrum of the semiconductor-based WBG and transmission spectrum of the single passband optical filter of FIG. 1.

FIG. 4 illustrates the expected spectral responses of tunable FP filter 11 (FIG. 3) and tunable WBGs $12_1$ and $12_2$ (FIG. 2). Response 41 represents the reflection spectrum of tunable WBG $12_1$ (and WBG $12_2$). Response 42 represents the transmission spectrum of tunable FP filter 11. As shown by response 41, the passband of the reflection spectrum of the tunable WBGs is relatively wide. As shown by response 42, the linewidth of the transmission spectrum of tunable FP filter 11 is relatively narrow. In addition, the sidelobes of the WBG response are insignificant at the wavelengths of the adjacent peaks of tunable FP filter 11 (off the scale in FIG. 4), thereby preventing wavelengths outside of the desired wavelength from passing through tunable FP filter 11 via these adjacent peaks. Thus, tunable optical filter 10 (FIG. 1) can provide a relatively low cost, easily fabricated solution for optical filters in DWDM applications.

Figure 5:
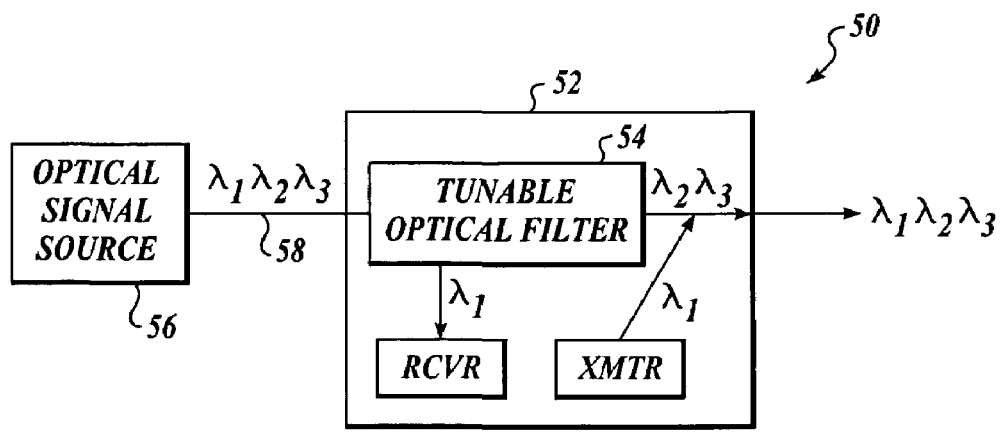
FIG. 5 is a diagram illustrating a DWDM optical communication system using a tunable passband optical filter according to an embodiment of the present invention.

FIG. 5 is a diagram illustrating an exemplary optical communication system 50 using a tunable optical filter according to an embodiment of the present invention. In this embodiment, system 50 includes an optical add-drop multiplexer (OADM) 52 having tunable optical filter 54 that is substantially similar to optical filter 10 (FIG. 1), and an optical signal source 56. In this embodiment, an optical fiber 58 connects optical signal source 56 to OADM 52.

In one embodiment, optical signal source 56 provides an optical communications beam or the like on which data is encoded. In the example of FIG. 5, optical signal source 56 includes three optical transmitter units (not shown) providing optical signals of wavelengths $\lambda_1$, $\lambda_2$ and $\lambda_3$. In this embodiment, DWDM or the like is employed with the optical beam such that a different channel is encoded with each of the wavelengths included in the optical beam. For example, the optical beam can be formed by combining the transmitter outputs using an optical multiplexer and amplifying the resulting signal using an erbium doped fiber amplifier (EDFA). The resulting optical beam is propagated to OADM 52.

Tunable optical filter 54 of OADM 52 can then be used to filter out the $\lambda_1$ wavelength from the optical beam, as previously described above for tunable optical filter 10 (FIG. 1). An optical transmitter can then add another signal of wavelength $\lambda_1$ to the optical beam ($\lambda_2$ and $\lambda_3$) outputted by tunable optical filter 54 to utilize the $\lambda_1$ channel. Other OADMs (not shown) can be present in system 50. The optical beam can be finally received by a termination unit (not shown) having an optical demultiplexer and three optical receivers (one for each of wavelengths $\lambda_1$, $\lambda_2$ and $\lambda_3$).

Embodiments of method and apparatus for a tunable optical filter are described herein. In the above description, numerous specific details are set forth (such as the materials of substrate 23 and regions 25 and 35, tuning mechanisms, three-dB couplers, etc.) to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring the description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
   a semiconductor substrate;
   a waveguide disposed in the semiconductor substrate, the waveguide having a core;
   a first reflector and a second reflector disposed in the waveguide defining a resonator region between the first and second reflector, the first and second reflectors including a plurality of polysilicon regions formed in the core of a material, the polysilicon regions having a refractive index different from that of the core, wherein any resonant wavelengths of an optical signal propagated in the waveguide to the first and second reflectors propagate through the first and second reflectors with substantially no loss.

2. The apparatus of claim 1 wherein the core comprises silicon and the material of the plurality of regions comprises silicon nitride.

3. The apparatus of claim 2 wherein the resonator region has a length of approximately one hundred microns.

4. The apparatus of claim 2 wherein the first and second reflectors have a length along the waveguide of approximately 20 microns.

5. The apparatus of claim 1 further comprising a heating element disposed proximate the resonator region.

6. The apparatus of claim 5 further comprising another cladding layer formed on the semiconductor substrate.

7. The apparatus of claim 1 wherein the semiconductor substrate is part of a silicon-on-insulator (SOI) wafer, the waveguide having a cladding layer formed from the insulator of the SOI wafer.

8. The apparatus of claim 1 wherein each region of the plurality of regions has a width of approximately one micron.

9. An integrated circuit, comprising:
   a Fabry-Perot (FP) filter including:
      a semiconductor layer having a first region; and
      a first reflector and a second reflector formed in the semiconductor layer at opposite ends of the first region, the first and second reflectors including trenches formed in the semiconductor layer and filled with a polysilicon material having a refractive index different from that of the semiconductor layer.

10. The integrated circuit FP filter of claim 9 wherein the semiconductor layer comprises crystalline silicon disposed above an insulator layer of a silicon-on-insulator (SOI) wafer, and the material of the trenches comprises silicon nitride.

11. The integrated circuit FP filter of claim 10 wherein the semiconductor layer is a core layer of a rib waveguide.

* * * * *

UNITED STATES PATENT AND TRADEMARK OFFICE
CERTIFICATE OF CORRECTION

PATENT NO. : 7,245,792 B2
APPLICATION NO. : 10/222218
DATED : July 17, 2007
INVENTOR(S) : Liu Page 1 of 1

It is certified that error appears in the above-identified patent and that said Letters Patent is hereby corrected as shown below:

In column 1, at line 37, delete "On conventional optical filter uses a Fabry-Perot (FP) filter. As is well known, FP filters have two reflective surfaces and a cavity between. A FP filter allows optical signals of the resonant wavelengths to pass through, reflecting signals that are not of the resonant wavelengths. However, a conventional FP filter has multiple transmission peaks with the distance between peaks referred to as the free spectral range (FSR). FP filters achieve relatively narrow pass bands, which are desirable in many optical filter applications, but the multiple transmission peaks may be unsuitable for DWDM applications. The FSR may be decreased by lengthening the distance between the reflective surfaces, but this increases the width of the pass bands. Further, conventional PWC-based FP filters are typically implemented using MEM technology or other relatively complex technology. Thus, a conventional FP filter may not be practical for use in DWDM applications".

Signed and Sealed this

Second Day of September, 2008

JON W. DUDAS
*Director of the United States Patent and Trademark Office*